US012066636B2

(12) United States Patent
Pankratz

(10) Patent No.: US 12,066,636 B2
(45) Date of Patent: Aug. 20, 2024

(54) POLARIZATION OPTIMIZED HEADS-UP DISPLAY

(71) Applicant: 3M INNOVATIVE PROPERTIES COMPANY, St. Paul, MN (US)

(72) Inventor: Stephan J. Pankratz, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/762,138

(22) PCT Filed: Sep. 15, 2020

(86) PCT No.: PCT/IB2020/058560
§ 371 (c)(1),
(2) Date: Mar. 21, 2022

(87) PCT Pub. No.: WO2021/064498
PCT Pub. Date: Apr. 8, 2021

(65) Prior Publication Data
US 2022/0350154 A1 Nov. 3, 2022

Related U.S. Application Data

(60) Provisional application No. 62/909,460, filed on Oct. 2, 2019.

(51) Int. Cl.
*G02B 27/01* (2006.01)
*G02B 5/30* (2006.01)

(52) U.S. Cl.
CPC ......... *G02B 27/0179* (2013.01); *G02B 5/305* (2013.01); *G02B 27/0101* (2013.01);
(Continued)

(58) Field of Classification Search
CPC ............ G02B 27/0179; G02B 27/0101; G02B 2027/0141; G02B 2027/0187; G02B 2027/0118; G02B 2027/013; G02B 5/305
See application file for complete search history.

(56) References Cited

U.S. PATENT DOCUMENTS

| 6,744,478 B1 * | 6/2004 | Asakura | G02B 27/0101 |
| | | | 349/9 |
| 2004/0135742 A1 * | 7/2004 | Weber | B32B 17/10036 |
| | | | 345/7 |

(Continued)

FOREIGN PATENT DOCUMENTS

| CN | 108333657 | 7/2018 |
| WO | WO 2013-190959 | 12/2013 |
| WO | WO 2019-049767 | 3/2019 |

OTHER PUBLICATIONS

International Search report for PCT International Application No. PCT/IB2020/058560 mailed on Oct. 27, 2020, 3 pages.

*Primary Examiner* — Nitin Patel
*Assistant Examiner* — Cory A Almeida
(74) *Attorney, Agent, or Firm* — Jonathan L. Tolstedt

(57) ABSTRACT

An optical system includes a display including an active display region having a maximum lateral dimension D and configured to emit an image for viewing by an eye of a viewer, the active display region including a display center and a predetermined region including the display center, the predetermined region having a largest lateral dimension d, such that $d/D \leq 0.25$; a windshield of a vehicle; and an optical film configured to receive the image emitted by the active display region and reflect or transmit at least a portion of the received image toward the windshield, the windshield configured to receive the image reflected or transmitted by the optical film and reflect at least a portion of the received image toward the eye, such that for at least one first location within the predetermined area of the active display region, the emitted image includes a first emitted image cone emitted from the first location, the first emitted image cone including a first emitted central image ray emitted from the first location, wherein the optical film is so oriented as to cause the first emitted central image ray to be substantially (Continued)

polarized in a plane of incidence when incident on the windshield.

18 Claims, 8 Drawing Sheets

(52) U.S. Cl.
CPC ..... *G02B 2027/0118* (2013.01); *G02B 2027/013* (2013.01); *G02B 2027/0141* (2013.01); *G02B 2027/0187* (2013.01)

(56) References Cited

U.S. PATENT DOCUMENTS

| | | |
|---|---|---|
| 2007/0217010 A1 | 9/2007 | Lippey |
| 2017/0045738 A1* | 2/2017 | Kim ..................... G02B 5/30 |
| 2017/0269428 A1 | 9/2017 | Otani |
| 2018/0373028 A1 | 12/2018 | Yamaguchi et al. |
| 2019/0285906 A1 | 9/2019 | Ogino |

* cited by examiner

POLARIZATION OPTIMIZED HEADS-UP DISPLAY

CROSS REFERENCE TO RELATED APPLICATIONS

This application is a national stage filing under 35 U.S.C. 371 of PCT/IB2020/058560, filed Sep. 15, 2020, which claims the benefit of Provisional U.S. Application No. 62/909,460, filed Oct. 2, 2019, the disclosure of which is incorporated by reference in its/their entirety herein.

SUMMARY

In some aspects of the present description, an optical system is provided, including a display having an active display region having a maximum lateral dimension D and configured to emit an image for viewing by an eye of a viewer, the active display region including a display center and a predetermined region including the display center, the predetermined region having a largest lateral dimension d, such that $d/D \leq 0.25$; a windshield of a vehicle; and an optical film configured to receive the image emitted by the active display region and reflect or transmit at least a portion of the received image toward the windshield, the windshield configured to receive the image reflected or transmitted by the optical film and reflect at least a portion of the received image toward the eye, such that for at least one first location within the predetermined area of the active display region, the emitted image includes a first emitted image cone emitted from the first location, the first emitted image cone including a first emitted central image ray emitted from the first location, wherein the optical film is so oriented as to cause the first emitted central image ray to be substantially polarized in a plane of incidence when incident on the windshield.

DETAILED DESCRIPTION

Figure 1:
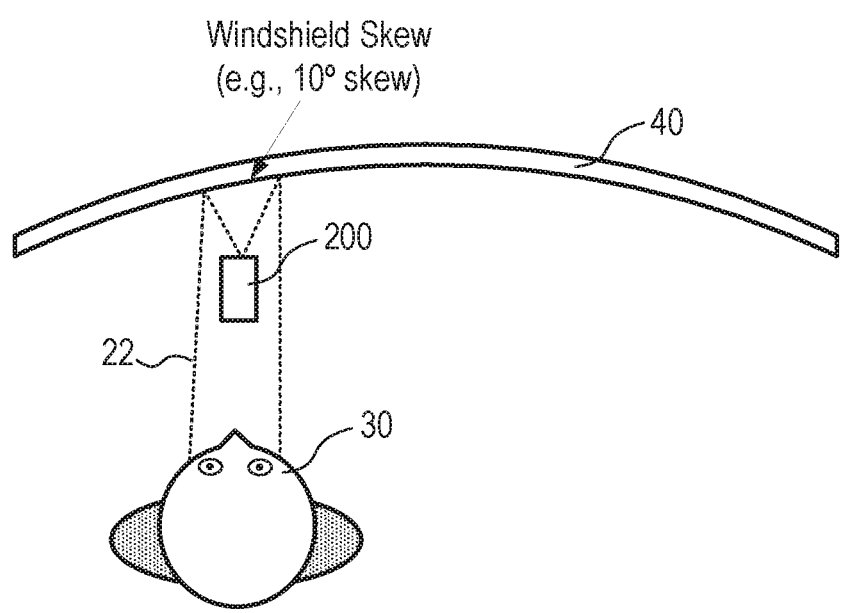
FIG. 1 is a top schematic view of a heads-up display, as seen in the prior art.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In modern heads-up display (HUD) systems, a display such as, for example, a liquid crystal display (LCD) projects an image onto the windshield of a vehicle where it may be viewed by an operator or occupant of the vehicle. One common issue seen in HUD systems is the issue of "ghosting", when the projected image reflects off of both the front glass-air interface (the inside surface of the windshield) and the back glass-air interface (the outside surface of the windshield), and the two reflected images "bounce back" to the viewer at different angles of incidence, creating the main image and an apparent second or "ghost" image offset from the main image which can decrease the legibility of the displayed information. One common method of addressing this ghosting problem is for windshield manufacturers to create a wedge shape between the outer and inner surfaces of the windshield. That is, the exterior glass-air interface is placed at a slightly different angle than the interior glass-air interface, with the intent of aligning the two reflected images into a single image, at least for one ideal viewing angle (e.g., that of a driver of average height). Another solution to the ghosting issue is, instead of creating a wedge shape in the windshield, embedding a weak reflective polarizer between two pieces of glass (i.e., sandwiched between an inner and outer glass sheet), such that linear polarized light is reflected off the reflective polarizer. One such example of a reflective polarizer is 3M™ Windshield Combiner Film (3M™ WCF) manufactured by the 3M Corporation. When the reflective polarizer is used, image rays from the display are linear polarized (e.g., with a P polarization state, or P-pol image rays) and directed toward the windshield at an angle at or very near to Brewster's angle. Brewster's angle is that angle of incidence at which the P-pol light passes through the inner glass-air interface without reflection, impinges on the reflective polarizer, and at least a portion of the P-pol light is reflected back toward the viewer as a single image (i.e., the only reflection of the image is from the reflective polarizer, and not the interior or exterior glass-air interface). This approach works well for strongly reducing ghost images from the front and back glass-air interfaces for incident angles near the Brewster angle. However, as HUD images become wider, and when the images are displayed at a horizontal skew angle relative to the observer (e.g., because of the inherent curves of a windshield, or the angle of the driver to the image), the P-pol image rays as defined according to the axial incidence play is transformed into a mixture of P-pol and S-pol light, resulting in higher ghost image reflections.

According to some aspects of the present description, an optical system based on optimization of the output polarization according to the windshield rake and skew angles is described. In some embodiments, the optimization may take place in the display itself. In some embodiments, the optimization may take place at any appropriate point in the light path from the display to the windshield. For example, the optimization may occur by controlling the orientation of an optical film within the light path (such as a reflective polarizer), or the orientation of a optical reflector (e.g., a mirror used to fold the light path), the orientation of a beam splitter within the light path, or the orientation of a retarder layer (e.g., a quarter-wave plate or half-wave plate) within the light path. These examples are not intended to be limiting.

In some embodiments, an optical system (e.g., a heads-up display, or HUD) includes a display, a windshield of a vehicle, and an optical film configured to receive the image emitted by the display and reflect or transmit at least a portion of the received image toward the windshield. In some embodiments, the display may be a liquid crystal display (LED), an organic light emitting display (OLED), a digital light processing (DLP) display, or any other appropriate picture generating unit (PGU). In some embodiments, the display may have an active display region having a maximum lateral dimension (i.e., diagonal of the active display area) D, and be configured to emit an image for viewing by an eye of a viewer, such as the eye of an operator of a vehicle. In some embodiments, the active display region may include a display center (i.e., the physical center of the display in both horizontal and vertical dimensions) and a predetermined region around and including the display center (i.e., the predetermined region is a subset or portion of the overall active display region). In some embodiments, the predetermined region may have a largest lateral dimension d, such that the ratio d/D is less than or equal to about 0.25 (i.e., the predetermined region may be approximately one quarter of the overall active display region). In some embodiments, the ratio d/D may be less than or equal to about 0.2, about 0.15, or about 0.1.

In some embodiments, the optical system may be centered on an optical axis which extends from the center point of the display to the windshield and into the eye of a viewer. In some embodiments, the optical axis may be defined by the first emitted central image ray.

In some embodiments, the windshield may be a glass windshield. In some embodiments, the windshield may be curved, either in a horizontal direction, vertical direction, or both. In some embodiments, the windshield may be at a rake angle (i.e., angled toward the operator from the vertical).

In some embodiments, the windshield may include a first interface (e.g., the interior glass/air interface) with a corresponding Brewster angle, such that the first emitted central image ray is incident on the first interface of the windshield at the Brewster angle.

In some embodiments, the optical film may be configured to receive the image emitted by the active display region and reflect or transmit at least a portion of the received image toward the windshield. In some embodiments, the windshield may be configured to receive the image reflected or transmitted by the optical film and reflect at least a portion of the received image toward the eye. For at least one first location within the predetermined area of the active display region, the emitted image may include a first emitted image cone emitted from the first location. In some embodiments, the first emitted image cone may include a first emitted central image ray emitted from the first location. In some embodiments, the optical film may be so oriented as to cause the first emitted central image ray to be substantially polarized in a plane of incidence when incident on the windshield. Stated another way, the orientation of the optical film may be adjusted (e.g., rotated) such that at least a central image ray is "tuned" to have a polarization that is in the plane of incidence when the image rays impinge on the windshield. In some embodiments, the optical film may be so oriented as to cause at least about 90%, or at least about 95%, of a polarization of the first emitted central image ray to be in the plane of incident when incident on the optical film.

In some embodiments, the optical film may be a reflective polarizer. In some embodiments, for substantially normally incident light and for at least one visible wavelength in a visible wavelength range extending from about 420 nm to about 670 nm, the reflective polarizer reflects between about 20% to about 40% of the incident light having a first polarization state (e.g., P-pol light), and transmits at least 60% of the incident light having an orthogonal second polarization state (e.g., light with linear S polarization type, or S-pol light). In some embodiments, the reflective polarizer may be a multilayer optical film including a plurality of layers numbering greater than about 30 in total, or greater than about 50 in total, or greater than about 100 in total. In some embodiments, the plurality of layers of the reflective polarizer include a plurality of alternating first and second layers. In some embodiments, each of the first and second layers may have an average thickness of less than about 500 nm. In some embodiments, a difference between the indices of refraction of the first and second layers along the first polarization state may be greater than about 0.05. In some embodiments, for substantially normally incident light and for at least one infrared wavelength in a wavelength range extending from about 700 nm to about 1500 nm, the reflective polarizer may reflect at least 40% of the incident light for at least one of the first and second polarization states. In other words, in some embodiments, the reflective polarizer may function to reflect heat from sunlight to prevent it from entering the HUD system.

In some embodiments, the optical film may be an absorbing polarizer. In some embodiments, for substantially normally incident light, the absorbing polarizer may transmit at least 60% of the incident light polarized along a first direction, and absorbs at least 60% of the incident light polarized along an orthogonal second direction, wherein the first emitted central image ray is polarized along a third direction when incident on the absorbing polarizer, the first and third directions forming an oblique angle therebetween greater than about 5 degrees.

In some embodiments, the optical film may be an optical reflector (e.g., an optical mirror). In some embodiments, the optical reflector may be configured to receive the image emitted by the active display region and reflect at least a portion of the received image toward the windshield. In some embodiments, the windshield may be configured to receive the image reflected by the optical reflector and reflect at least a portion of the received image toward the eye of a viewer. In some embodiments, the optical reflector may be so oriented as to cause the first emitted central image ray to be substantially polarized in the plane of incidence when incident on the windshield. In some embodiments, for substantially normally incident light and for at least one visible wavelength in a visible wavelength range extending from about 420 nm to about 670 nm, the optical reflector may reflect at least 60% of the incident light polarized along each of mutually orthogonal first and second (e.g., linear P-pol and linear S-pol light) directions. In some embodiments, for the substantially normally incident light and for at least one infrared wavelength in a wavelength range extending from about 700 nm to about 1500 nm, the optical reflector transmits at least 40% of the incident light polarized along at least one of mutually orthogonal first and second directions. In some embodiments, the optical reflector may be a multilayer optical film including a plurality of alternating first and second layers, each of the first and second layers having an average thickness of less than about 500 nm.

In some embodiments, the optical system may further include a retarder layer (e.g., a quarter-wave plate or half-wave plate) disposed between the optical film and the windshield. In some embodiments, the optical film may be an optical reflector configured to receive the image emitted by the active display region and reflect at least a portion of the received image toward the windshield. In some embodiments, the windshield may be configured to receive the image reflected by the optical reflector after the reflected image passes through the retarder layer, and reflect at least a portion of the received image toward the eye. In some embodiments, the retarder layer is so oriented as to cause the first emitted central image ray to be substantially polarized in the plane of incidence when incident on the windshield. Turning now to the figures, FIG. 1 is a top schematic view of a heads-up display, as seen in the prior art. As shown in FIG. 1, a typical heads-up display 200 projects an image onto a windshield 40, where it is seen by a viewer 30 as reflected image 22. Most windshields available today are curved, sometimes in both a horizontal direction (as shown in the top-down view of FIG. 1) and a vertical direction (i.e., top to bottom, as seen by the viewer 30). For example, the image projected by HUD 200 onto windshield 40 as shown in FIG. 1 impinges on the windshield with a horizontal skew angle of about 10 degrees, which is not unusual for a modern car, and can sometimes be even greater than 10 degrees. It is also important to note that the location of HUD 200 may vary from vehicle type to vehicle type, and it may be disposed at a point farther away from the viewer 30 than that shown in FIG. 1 (imparting an even greater skew angle on reflected image 22). When the image is projected to be primarily P-pol light relative to the axial incidence plane (that is, relative to the optical axis), the light shifts to a mixture of P-pol and S-pol light due to the projection onto a surface with a significant horizontal skew angle. This increased S-pol component can cause increased ghosting as seen by the viewer 30.

Figure 2A:
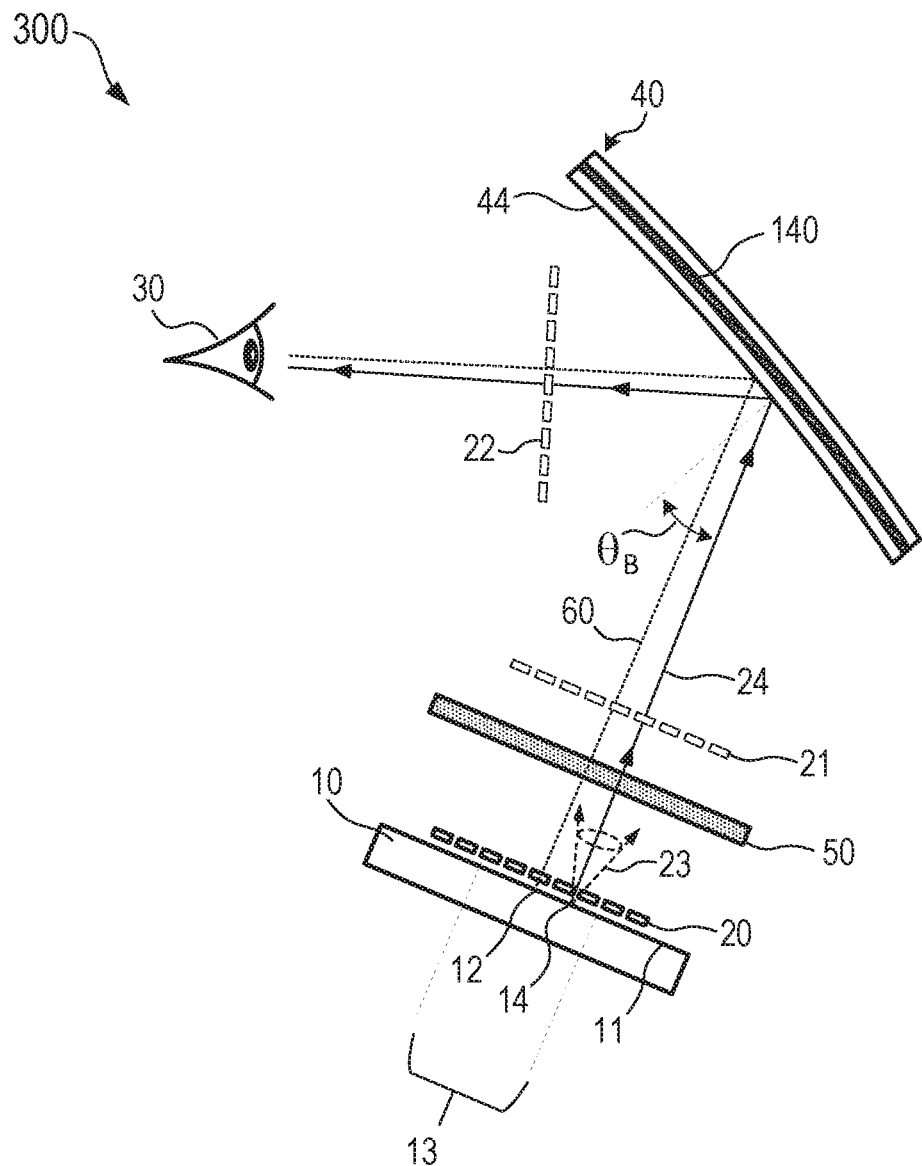
FIG. 2A is a cross-sectional view of a polarization optimized heads-up display system, in accordance with an embodiment of the present description.

FIG. 2A is a cross-sectional view of a polarization optimized heads-up display system, according to the present description. In some embodiments, the polarization optimized heads-up display (HUD) 300 includes a display 10, such as an LED, OLED, or other PGU. The display 10 is configured to emit an image 20 along an optical axis 60, such that it will be projected onto a windshield 40, which has a first interface 44 (e.g., the interface between air and glass on the inside of windshield 40). The emitted image 20 includes an emitted light cone 23, emitted from a first location 14 on the display, and which includes an emitted central image ray 24. In some embodiments, emitted image 20 passes through an optical film 50, where at least a portion 21 of the image is transmitted therethrough to be projected onto windshield 40. at least a portion 21 of the image is then reflected off the windshield as reflected image 22, which travels to the eye of a viewer 30. In some embodiments, central image ray 24 may coincide with optical axis 60.

In some embodiments, windshield 40 may include an inner reflective polarizer layer 140 (e.g., a polymeric film reflective polarizer sandwiched between inner and outer glass layers). In some embodiments, this may be a weak reflective polarizer, reflecting between 20% to 40% of incident light having a first polarization state and transmitting at least 60% of incident light having a second, orthogonal polarization state. Reflective polarizer 140 is discussed in more detail in the discussion of FIG. 3 elsewhere herein.

Figure 2B:
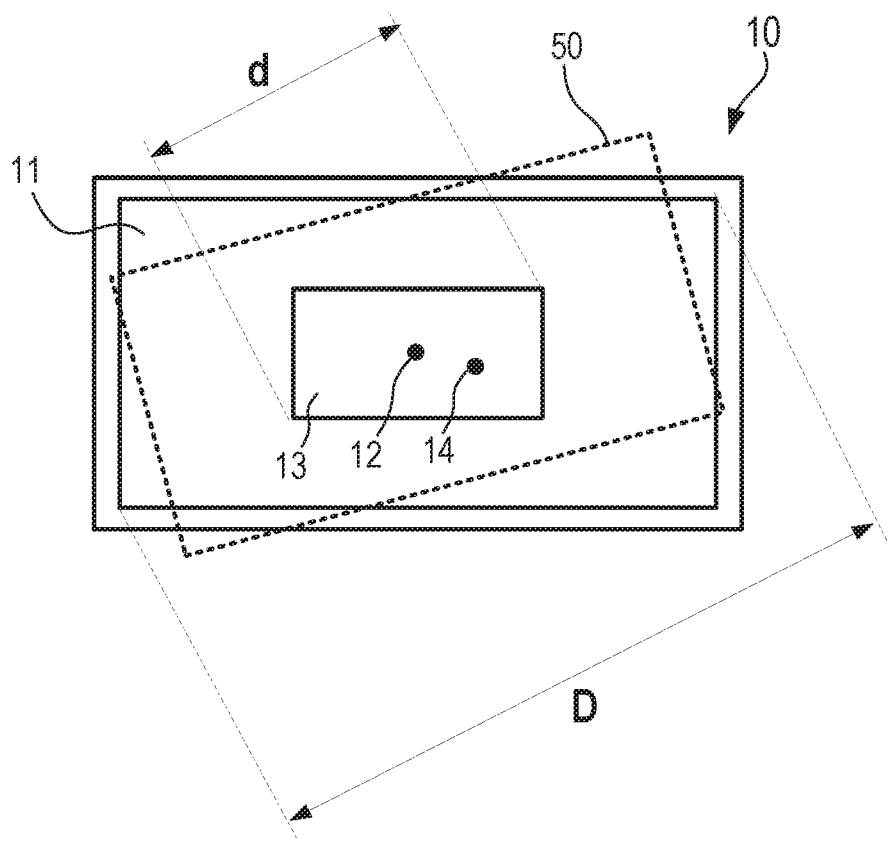
FIG. 2B is a front view of a display system and optical film, in accordance with an embodiment of the present description.

FIG. 2B is a front view of display 10 and optical film 50, showing additional details. FIGS. 2A and 2B may best be examined in tandem for the following discussion. A predetermined area 13 of the active display region 11 of display 10 contains display center 12 (the physical center of the display in both the horizontal and vertical dimensions) and a first location 14 emitting a light cone 23. In some embodiments, first location 14 and the display center 12 may be co-located (i.e., may be the same point). Emitted light cone 23 includes at least a first emitted central image ray 24, which is emitted by display 10, travels through optical film 50, is reflected from windshield 40, and continues to the eye of a viewer 30. In some embodiments, first emitted central image ray 24 may be coincident with optical axis 60, or may be substantially parallel to optical axis 60. Turning to FIG. 2B, predetermined area 13 may have a largest lateral dimension d and the active display region 11 may have a largest lateral dimension D such that the ratio of d/D is less that or equal to about 0.25, or about 0.2, or about 1.5, or about 1.0. In other words, predetermined area 13 represents a central portion of the active display region 11.

In some embodiments, optical film 50 may be oriented (e.g., rotated) such that first emitted central image ray 24 will be substantially polarized in the plane of incidence when incident on windshield 40. In other words, optical film 50 may be rotated or otherwise oriented from a "traditional" orientation such that the polarization of first emitted central image ray 24 will be substantially polarized at the point of incidence with windshield 40, which, as previously discussed, may be at a substantial skew angle on curved windshield 40 relative to viewer 30. It is in this manner that the system may compensate for any ghosting seen by viewer 30 due to the windshield skew angle.

It should be noted that optical film 50 is shown in FIG. 2B as having a rectangular shape that is physically rotated with respect to display 10. However, the shape of the physical optical film 50 is arbitrary, and it is the orientation of the polarization features within optical film 50 that are of importance.

Also, as will be seen in other embodiments described herein, the optimization of the polarization of the image ray 24 may be done at other locations along the optical path of image ray 24.

Figure 2C:
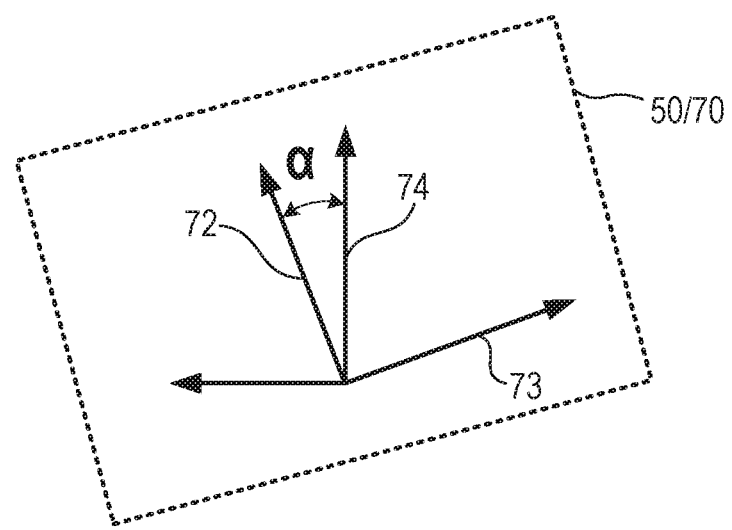
FIG. 2C illustrates various types of polarization associated with an absorbing polarizer, in accordance with an embodiment of the present description.
Figure 2D:
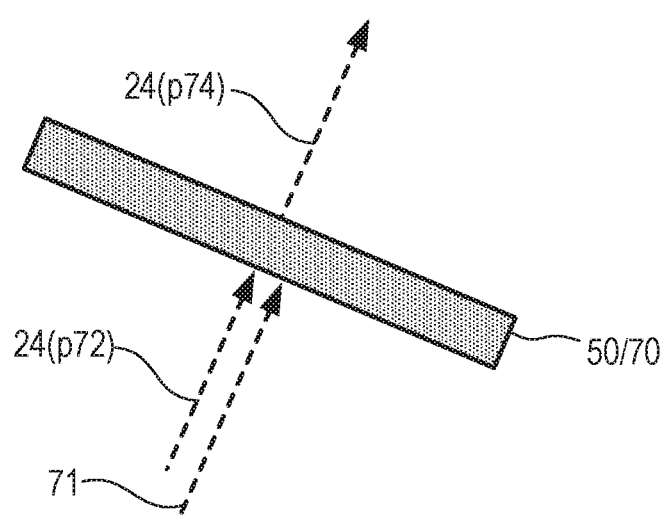
FIG. 2D is a side view of an absorbing polarizer, in accordance with an embodiment of the present description.

FIG. 2C and FIG. 2D illustrate an embodiment where optical film 50 is an absorbing polarizer 70. FIG. 2C and FIG. 2D are best examined in tandem for the following discussion. When optical film 50 is an absorbing polarizer 70, for normally incident light 71 (which may include central image ray 24), the absorbing polarizer 70 may transmit at least 60% of incident light 71 polarized along a first direction (polarization direction 72, as shown in FIG. 2C) and absorb at least 60% of incident light 71 polarized a long an orthogonal second direction (polarization direction 73). In some embodiments, absorbing polarizer 70 may be oriented such that light passing through absorbing polarizer 70 may be polarized along a new, third direction 74. In some embodiments, the first direction 72 and third direction 74 form an oblique angle α therebetween which is greater than about 5 degrees. Stated another way, and turning to FIG. 2D, central image ray 24 is incident on absorbing polarizer 70 with polarization direction 72, shown as 24(*p*72), at least a portion of the image rage 24 will emerge from absorbing polarizer 70 with polarization direction 74, shown as 24(*p*74). In other words, the polarization of central image ray 24 is rotated by optical film 50 such that it is substantially polarized in a plane of incidence on the skewed windshield.

Figure 3:
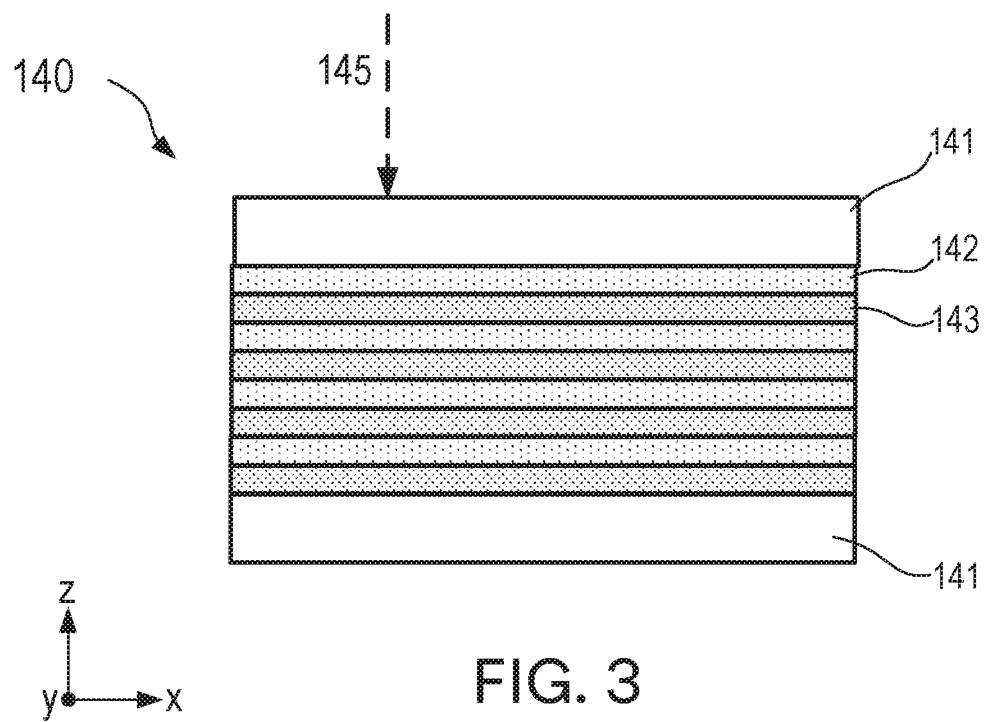
FIG. 3 is a cross-sectional view of a reflective polarizer, in accordance with an embodiment of the present description.

As discussed with regard to FIG. 2A, windshield 40 may include a reflective polarizer 140 embedded therein. FIG. 3 is a cross-sectional view of one embodiment of such a reflective polarizer 140. In some embodiments, reflective polarizer 140 may be constructed as a multilayer optical film (MOF). In some embodiments, the reflective polarizer 140 includes a plurality of alternating first polymeric layers 142 and second polymeric layers 143. In some embodiments, the combined alternating first 142 and second 143 polymeric layers may number between 30 and 700. In some embodiments, each first 142 and second 143 polymeric layer may have an average thickness less than about 500 nm.

In some embodiments, the first polymeric layers 142 may be substantially isotropic (i.e., exhibiting substantially identical indices of refraction when measured in different directions). In some embodiments, the second polymeric layers 143 may be substantially birefringent (i.e., exhibiting two different indices of refraction when measured in different, orthogonal directions) and have in-plane indices of refraction nx and ny along orthogonal directions, with a difference between nx and ny being greater than about 0.05, or greater than about 0.03, or greater than about 0.01. In some embodiments, additional layers 141 (e.g., adhesive layers, other substrate layers) may be present on the external surfaces of reflective polarizer 140.

In some embodiments, reflective polarizer 140 may be relatively weak, such that, when an incident light ray 145 impinges on the film, and for at least one visible wavelength in a visible wavelength range extending from about 420 nm to about 670 nm, the reflective polarizer reflects between about 20% to about 40% of incident light 145 having a first polarization state (e.g., P-pol light), and transmits at least 60% of the incident light having an orthogonal second polarization state (e.g., S-pol light).

In some embodiments, for substantially normally incident light 145 and for at least one infrared wavelength in an infrared wavelength range extending from about 700 nm to about 1500 nm, the reflective polarizer may reflect at least 40% of the incident light for at least one of the first and second polarization states. In some embodiments, this can help reduce the transmission of unwanted heat (into the HUD) due to solar light impinging on external surfaces of the windshield.

Figure 4:
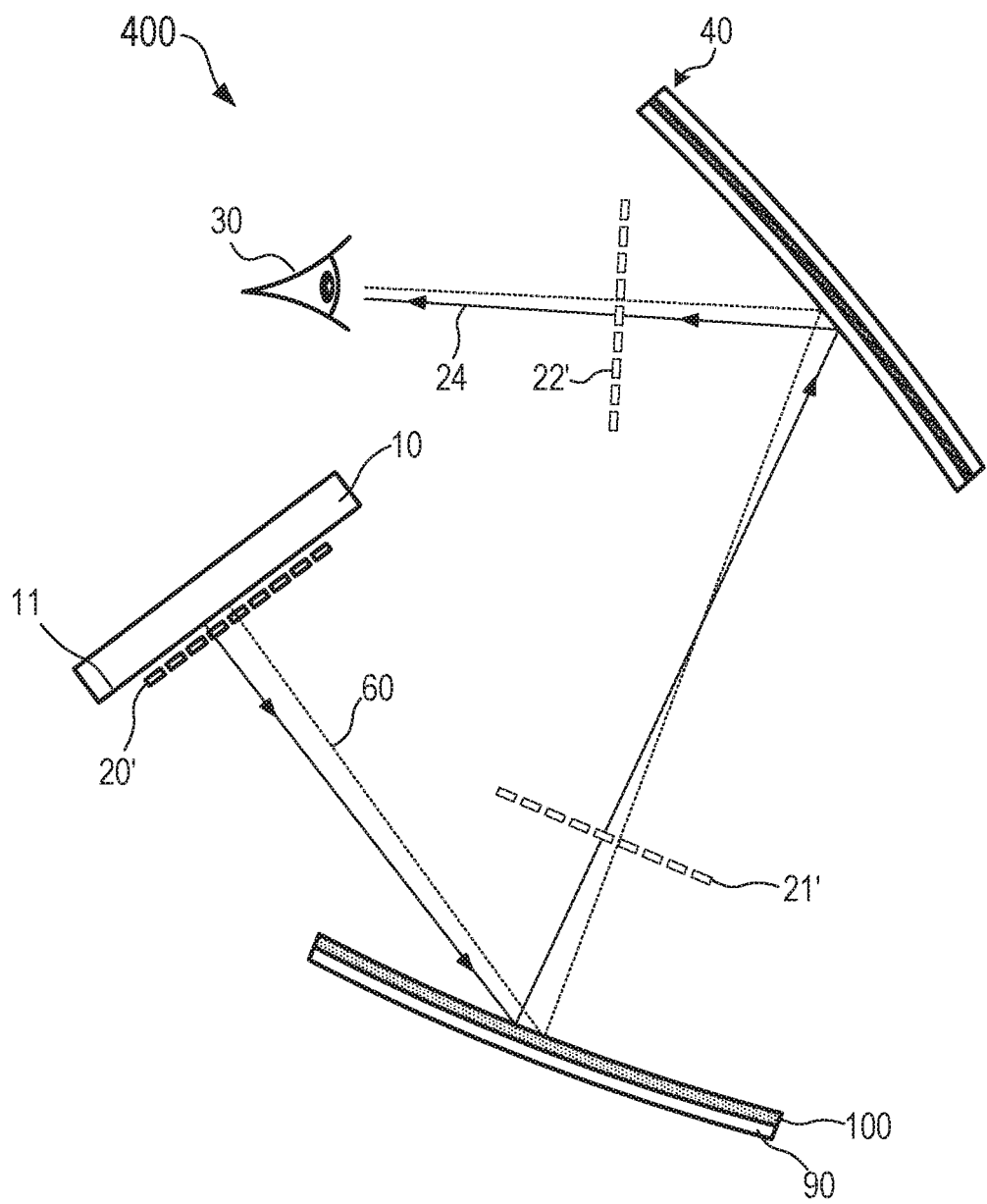
FIG. 4 is a cross-sectional view of a polarization optimized heads-up display system, in accordance with an alternate embodiment of the present description.
Figure 5:
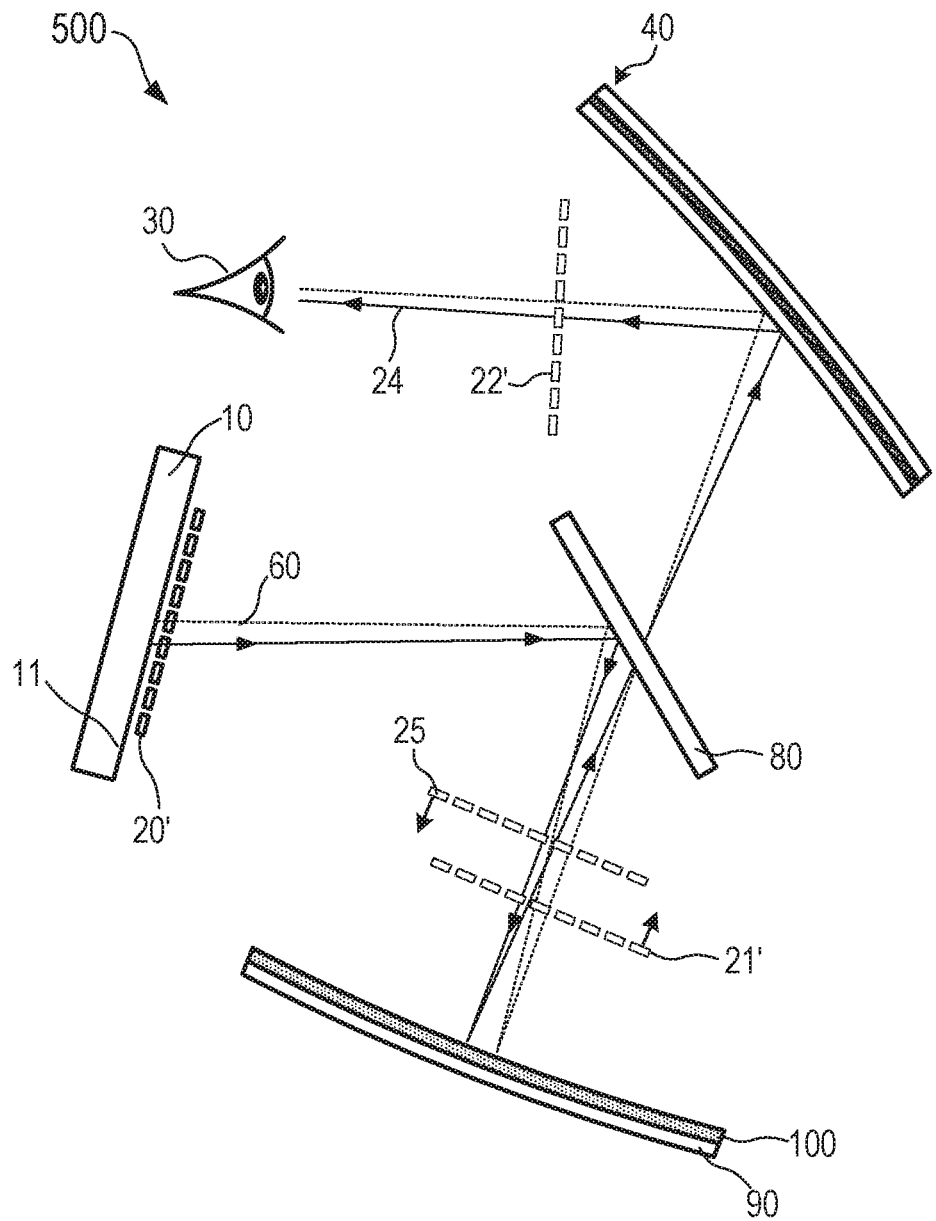
FIG. 5 is a cross-sectional view of a polarization optimized heads-up display system, in accordance with another alternate embodiment of the present description.

FIGS. 4 and 5 provide cross-sectional views of alternate embodiments of a polarization optimized heads-up display system, according to the present description. Many of the elements in FIGS. 4 and 5, as well as in FIG. 2A, are common. Elements in FIGS. 2A, 4, and 5 which share like-numbered reference designators have identical functions, and additional description may not be provided beyond that previously presented.

In FIG. 4, polarization optimized heads-up display system 400 has a "folded" optical path (as defined by optical axis 60), where image 20' is emitted from active display region 11 of display 10 and is first reflected from optical reflector 90 (e.g., a mirror, reflective film, etc.) before at least a portion of the image 21' is redirected toward windshield 40. In some embodiments, a retarder layer 100 (e.g., a quarter wave plate or half wave plate) may be disposed on optical reflector 90. In some embodiments, one or both of optical reflector 90 and retarder layer 100 may be so oriented as to cause the first emitted central image ray 24 to be substantially polarized in the plane of incidence when incident on windshield 40. After image 21' is reflected from windshield 40, at least a portion of the image 22' it is redirected toward the viewer 30 as the perceived image. In some embodiments, optical reflector 90 may be substantially flat, curved (e.g., convex or concave to add power), or free-form. In some embodiments, optical reflector 90 may be a polarizing reflector (e.g., a polarizing reflective multilayer optical film) capable of polarization rotation without a separate retarder layer 100.

In FIG. 5 polarization optimized heads-up display system 500 adds an additional fold into the optical path represented by optical axis 60. Display 10 emits image 20' from an active display region 11. Image 20' travels toward optical beamsplitter 80. In some embodiments, optical beamsplitter 80 may be a reflective polarizer which substantially reflects incident light of a first polarization state (e.g., linear S-pol light) and substantially transmits incident light of a second, orthogonal polarization state (e.g., linear P-pol light). In one embodiment, central image ray 24 may be emitted as light with a S polarization state, be reflected by optical beamsplitter 80 to be redirected toward optical reflector 90. A retarder layer 100 disposed on optical reflector may then convert the S-pol light to P-pol light as at least a portion of the image 21' is redirected back toward optical beamsplitter 80, this time passing through. Image 21' is reflected from windshield 40, where at least a portion of the image 22' is redirected toward viewer 30. The orientation and rotation angle of the beamsplitter 80 may be used to set the output polarization seen in the plane of incidence. In the embodiments of FIGS. 4 and 5, any of elements including optical beamsplitter 80, optical reflector 90, and retarder layer 100 may be so oriented such that the image (including image ray 24) is substantially polarized at the point of incidence on skewed windshield 40.

Figure 6A:
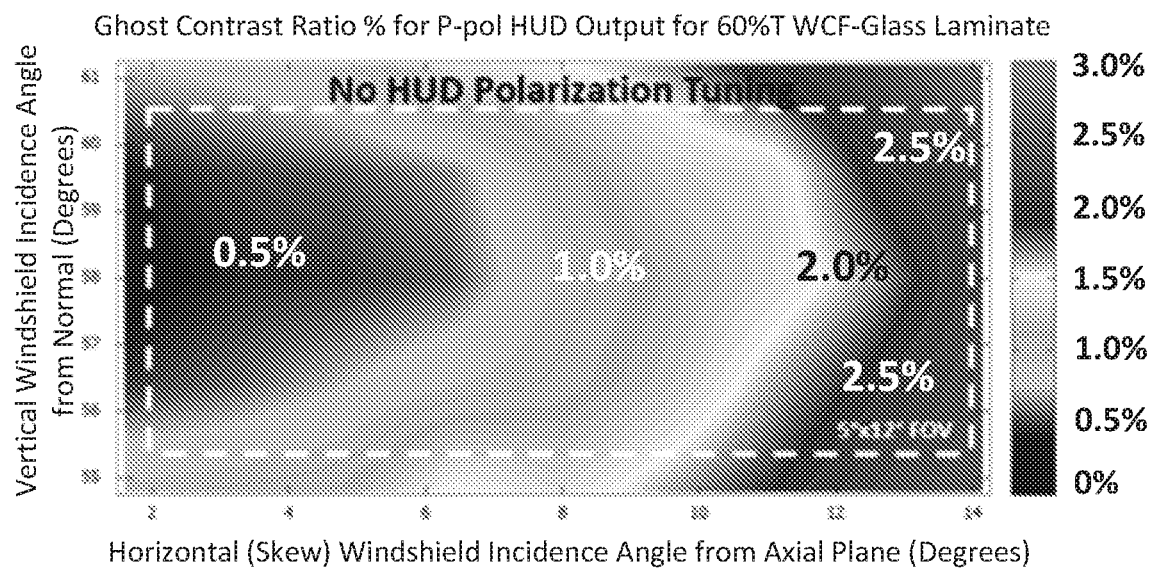
FIGS. 6A and 6B are graphical plots illustrating the effects of a polarization optimized heads-up display, in accordance with an embodiment of the present description.
Figure 6B:
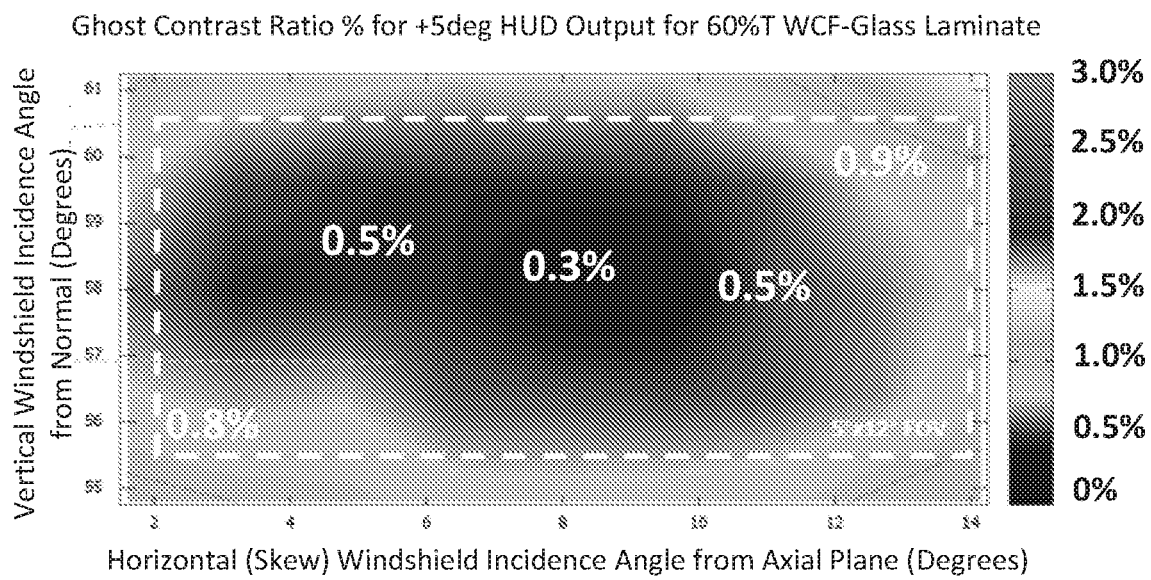

Finally, FIGS. 6A and 6B provide graphical plots illustrating the effects of a polarization optimized heads-up display, according to the present description. FIG. 6A provides a plot of ghost image contrast ratio percentage for P polarized heads-up display output when no polarization optimization tuning is performed (i.e., for the embodiment of FIG. 2A, optical film 50 is not rotated with respect to display 10). The x-axis of FIG. 6A plots the horizontal skew angle of the windshield relative to the axial plane (the angle off axial plane at the point of image incidence). The y-axis plots the vertical angle of incidence. The dashed, rectangular box represents the "eye box" or active viewing area of the displayed image (approximately 5° by 12°) as would be seen by an operator of the vehicle. The shaded contours of FIG. 6A show that the contrast ratio of ghost images increases significantly toward the right side of the "eye box," greater than 2 percent and approaching 3 percent.

FIG. 6B shows the improved performance of the same system achieved when the HUD output polarization is rotated by about 5 degrees. Nearly the entire "eye box" of FIG. 6B demonstrates less than 1% ghost contrast ratio, greatly reducing the ghost images perceived by an operator.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:
   a display comprising an active display region having a maximum lateral dimension D and configured to emit an image for viewing by an eye of a viewer, the active display region comprising a display center and a predetermined region comprising the display center, the predetermined region comprising a largest lateral dimension d, $d/D \leq 0.25$;
   a windshield of a vehicle; and
   an optical film configured to receive the image emitted by the active display region and reflect or transmit at least a portion of the received image toward the windshield, the windshield configured to receive the image reflected or transmitted by the optical film and reflect at least a portion of the received image toward the eye, such that for at least one first location within the predetermined area of the active display region, the emitted image comprises a first emitted image cone emitted from the first location, the first emitted image cone comprising a first emitted central image ray emitted from the first location, wherein the optical film is rotated with respect to and substantially parallel to a plane defined by a surface of the display so as to cause a polarization direction of the first emitted central image ray to be modified from the polarization direction of the first emitted central image ray as emitted from the first location of the display such that the first emitted central image ray is substantially polarized in a plane of incidence when incident on the windshield.

2. The optical system of claim 1 substantially centered on an optical axis extending from the display center to the eye.

3. The optical system of claim 2, wherein the optical axis comprises the first emitted central image ray.

4. The optical system of claim 1, wherein the display comprises a liquid crystal display, an organic light emitting diode display, or a digital light processing display.

5. The optical system of claim 1, wherein $d/D \leq 0.2$.

6. The optical system of claim 1, wherein the windshield comprises a first interface and a corresponding first Brewster angle, and wherein the first emitted central image ray is incident on the first interface of the windshield at the first Brewster angle.

7. The optical system of claim 1, wherein the windshield comprises a reflective polarizer embedded therein.

8. The optical system of claim 7, wherein for substantially normally incident light and for at least one visible wavelength in a visible wavelength range extending from about 420 nm to about 670 nm, the reflective polarizer reflects between about 20% to about 40% of the incident light having a first polarization state, and transmits at least 60% of the incident light having an orthogonal second polarization state.

9. The optical system of claim 8, wherein for the substantially normally incident light and for at least one infrared wavelength in an infrared wavelength range extending from about 700 nm to about 1500 nm, the reflective polarizer reflects at least 40% of the incident light for at least one of the first and second polarization states.

10. The optical system of claim 8, wherein the reflective polarizer comprises a plurality of layers numbering greater than about 30 in total and comprising a plurality of alternating first and second layers, each of the first and second layers having an average thickness of less than about 500 nm, a difference between indices of refraction of the first and second layers along the first polarization state being greater than about 0.05.

11. The optical system of claim 1, wherein the optical film comprises an absorbing polarizer, such that for substantially normally incident light, the absorbing polarizer transmits at least 60% of the incident light polarized along a first direction, and absorbs at least 60% of the incident light polarized along an orthogonal second direction, wherein the first emitted central image ray is polarized along a third direction when incident on the absorbing polarizer, the first and third directions forming an oblique angle therebetween greater than about 5 degrees.

12. The optical system of claim 1, wherein the optical film comprises an optical reflector configured to receive the image emitted by the active display region and reflect at least a portion of the received image toward the windshield, the windshield configured to receive the image reflected by the optical reflector and reflect at least a portion of the received image toward the eye, wherein the optical reflector is so oriented as to cause the first emitted central image ray to be substantially polarized in the plane of incidence when incident on the windshield.

13. The optical system of claim 12, wherein for substantially normally incident light and for at least one visible wavelength in a visible wavelength range extending from about 420 nm to about 670 nm, the optical reflector reflects at least 60% of the incident light polarized along each of mutually orthogonal first and second directions.

14. The optical system of claim 12, wherein for the substantially normally incident light and for at least one infrared wavelength in an infrared wavelength range extending from about 700 nm to about 1500 nm, the optical reflector transmits at least 40% of the incident light polarized along at least one of mutually orthogonal first and second directions.

15. The optical system of claim 1 further comprising a retarder layer disposed between the optical film and the windshield, wherein the optical film comprises an optical reflector, the optical reflector configured to receive the image emitted by the active display region and reflect at least a portion of the received image toward the windshield, the windshield configured to receive the image reflected by the optical reflector after the reflected image passes through the retarder layer, and reflect at least a portion of the received image toward the eye, wherein the retarder layer is so oriented as to cause the first emitted central image ray to be substantially polarized in the plane of incidence when incident on the windshield.

16. The optical system of claim 1, wherein the optical film is so oriented as to cause at least 90% of a polarization of the first emitted central image to be in the plane of incidence when incident on the first reflective polarizer.

17. The optical system of claim 1, wherein the windshield comprises glass.

18. The optical system of claim 1, wherein the windshield is curved.

* * * * *